United States Patent [19]

Rockwood et al.

[11] Patent Number: 4,565,395
[45] Date of Patent: Jan. 21, 1986

[54] EXTENSIBLE SWIVEL

[75] Inventors: Richard D. Rockwood, Marshfield; Bernard J. Ruskin, Marblehead, both of Mass.

[73] Assignee: Chapman Manufacturing Company, Inc., Avon, Mass.

[21] Appl. No.: 595,237

[22] Filed: Apr. 2, 1984

[51] Int. Cl.[4] .................. F16L 27/00; F16D 1/12
[52] U.S. Cl. ..................... 285/282; 285/DIG. 8; 411/117; 411/41; 248/415; 248/289.1
[58] Field of Search .............. 403/113, 116, 117, 78, 403/41, 24, 348, 349, 164, 165; 285/DIG. 8, 282; 248/415, 418, 289.1

[56] References Cited

U.S. PATENT DOCUMENTS

| | | | |
|---|---|---|---|
| 2,242,303 | 5/1941 | Irmischer | 285/97.7 |
| 2,262,585 | 11/1941 | Irmischer | 285/97.3 |
| 2,686,067 | 8/1954 | Stepans | 285/161 |
| 3,022,096 | 2/1962 | Schwartz | 285/282 X |
| 3,034,809 | 5/1962 | Greenberg | 285/267 |
| 3,104,067 | 9/1963 | Stiffel | 240/81 |
| 3,604,923 | 9/1971 | Moffatt | 285/282 |
| 4,009,731 | 3/1977 | Denz | 285/282 |
| 4,347,557 | 8/1982 | Warshawsky | 403/164 X |
| 4,487,469 | 12/1984 | Björk | 403/349 X |

Primary Examiner—Cornelius J. Husar
Assistant Examiner—Todd G. Williams
Attorney, Agent, or Firm—Morse, Altman & Dacey

[57] ABSTRACT

An extensible swivel for lamps and the like is disclosed. The extensible swivel preferably is incorporated in a leg or an arm of a lamp, where the leg or the arm includes upper and lower tubular members joined by a retainer ring. An extension sleeve preferably is secured with one end in the upper tubular member and, a hollow swivel is secured to the sleeve's other end. The lower tubular member is provided with a key sleeve having a key along its axial length. The hollow swivel is designed to be accommodated, for axial and rotational adjustment, within the key sleeve. Such adjustment, when made, is held frictionally stable and stationary. The hollow swivel includes a spindle on which the swivel's operative parts are mounted. These operative parts include a stop ring fixedly mounted to the spindle, at least one double-leg ring member mounted in operative association with the stop ring and, a stop bushing provided with a channel and mounted in operative association with the double-leg ring member. The channel is designed to accommodate the key of the key sleeve. The rotational adjustment of the swivel can vary anywhere from a fraction of a revolution to several revolutions.

20 Claims, 12 Drawing Figures

U.S. Patent   Jan. 21, 1986   Sheet 1 of 2   4,565,395
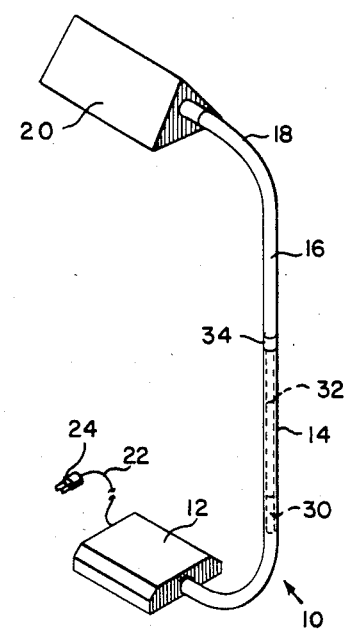
Fig. 1
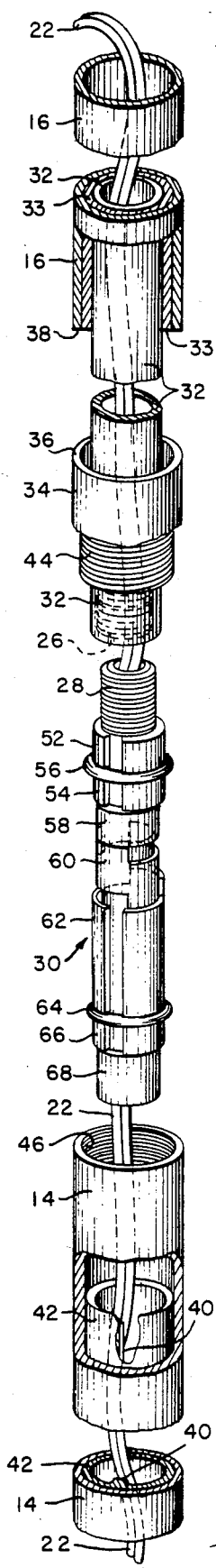
Fig. 2
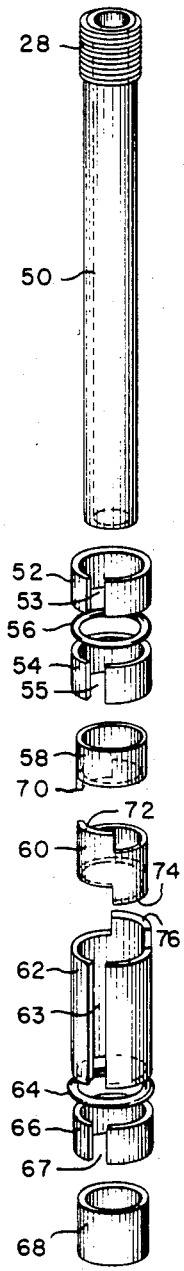
Fig. 3
Fig. 12
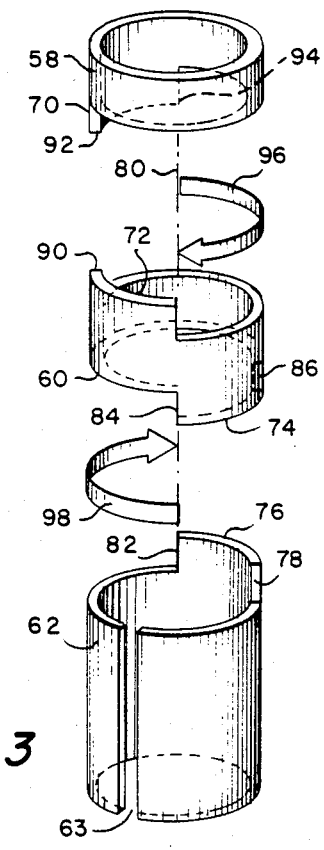
Fig. 4

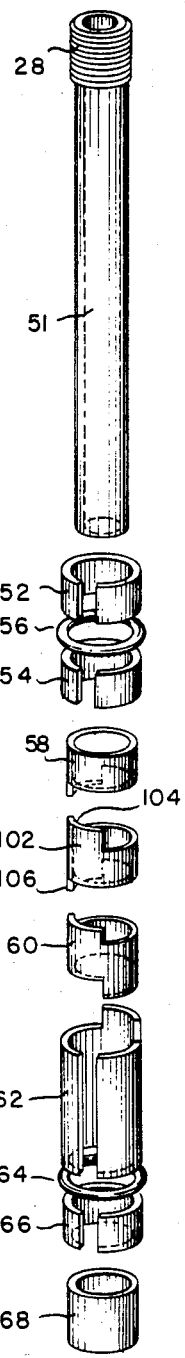
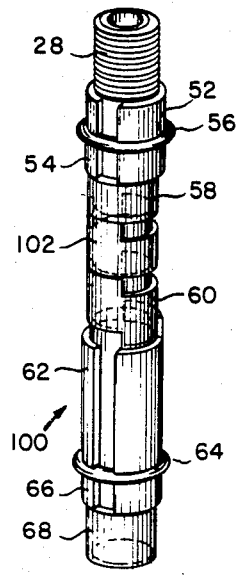
Fig. 6
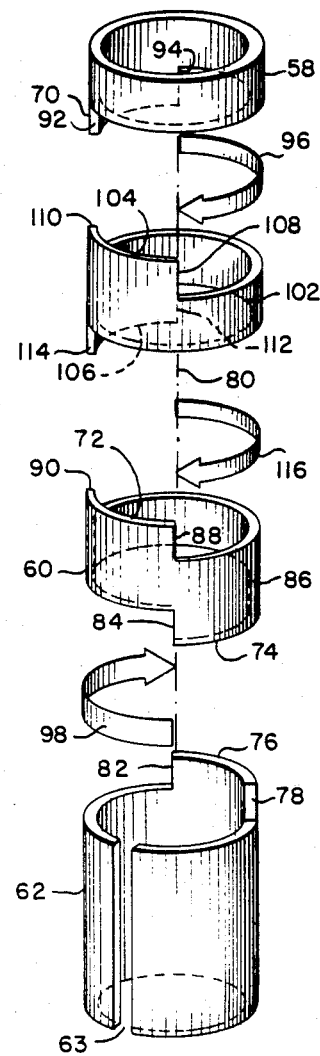
Fig. 7
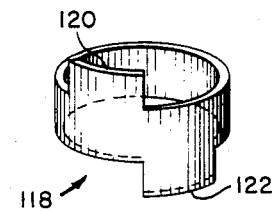
Fig. 8
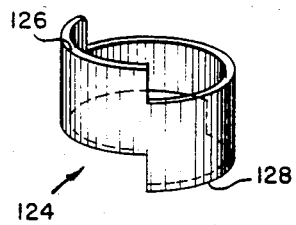
Fig. 9
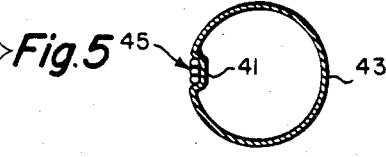
Fig. 5
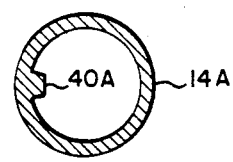
Fig. 10  Fig. 11

EXTENSIBLE SWIVEL

BACKGROUND OF THE INVENTION

1. Field of the Invention

The present invention relates generally to swivels and, more particularly, to an extensible swivel for lamps and the like.

2. The Prior Art

Extensible swivels for lamps have been known for sometime. For the most part, such extensible swivels feature a key against which a projecting part abuts, allowing thus a rotational adjustment of less than one complete revolution, i.e., less than 360°. See, for example, a pending application entitled SWIVEL STOP, Ser. No. 268,257, filed May 29, 1981, now U.S. Pat. No. 4,462,621, granted July 31, 1984 and assigned to a common assignee. For many users, this limitation in rotational adjustment to less than 360° is considered an undesirable handicap. The alternative arrangement of having no key and/or projecting part, permitting unfettered revolutions in either direction, presents a safety hazard, however. For, the insulation on the electrical cord, accommodated within the arms and legs of the lamp's structure, tends to crack upon being twisted repeatedly and tightly. With the development of such cracks in the insulation, a short circuit between the cord and the structure of the lamp can occur. Such short circuit then presents a fire hazard as well as potential harm or injury to a user. Hence, such unfettered swivels are largely prohibited by local ordinances governing the sale and use of electrical appliances.

SUMMARY OF THE INVENTION

It is a principal object of the present invention to overcome the above disadvantages by providing an extensible swivel for lamps and the like whose rotational adjustment can vary anywhere from a fraction of a revolution to several revolutions.

More specifically, it is an object of the present invention to provide an extensible swivel for lamps and the like comprising a hollow spindle on which the operative parts of the swivel are mounted. The extensible swivel preferably is incorporated in a leg or an arm of a lamp or the like, where the leg or the arm includes upper and lower tubular structural members joined by a retainer ring. An extension sleeve preferably is secured with one end in the upper tubular member and the swivel is secured to the sleeve's other end. The lower tubular member is provided with a key sleeve having a key along its axial length. The swivel is designed to be accommodated, for axial and rotational adjustment, within the key sleeve. Such axial and/or rotational adjustment, when effected, is held frictionally stable and stationary by suitable gaskets and/or the periphery of certain parts of the swivel bearing against the internal surface of the key sleeve. While the length of the extension sleeve determines the extent of the axial adjustment possible for the swivel, the rotational adjustment thereof is variable from a fraction of a revolution to several revolutions.

The operative parts of the swivel, which are responsible for endowing it with this rotational adjustment capability, include, in addition to the already mentioned hollow spindle, a stop ring having an arcuate segment and secured about the spindle, at least one double-leg ring member having opposed arcuate segments and mounted about the spindle in operative association with the stop ring, and a stop bushing having an arcuate segment and a channel and mounted about the spindle in operative association with the double-leg ring member. The key of the key sleeve is designed to extend into the channel of the stop bushing. Preferably, the spindle also carries a plurality of space bushings and at least one flexible gasket, all mounted about the spindle. Preferably, the external diameters of the plurality of spacer bushings and of the stop bushing are identical and designed frictionally to engage the internal periphery of the key sleeve. Consequently, once an axial and rotational adjustment of the swival is effected, the swivel will maintain its adjusted position until it is readjusted to a different position. Preferably, a retainer ring is provided to retain the swivel within the key sleeve and to prevent its accidental removal therefrom by a careless user. Preferably, the key of the key sleeve is formed integral with and of the key sleeve during the latter's manufacture as a radially-inwardly protruding projection thereof, with the projection preferably being reinforced with a plurality of steel wires laid within the projection. Preferably, the built-in rotational adjustment of the swivel varies from a fraction of a revolution to two revolutions.

Other objects of the present invention will in part be obvious and will in part appear hereinafter.

The invention accordingly comprises the extensible swivel of the present disclosure, its components, parts and their interrelationships, the scope of which will be indicated in the appended claims.

BRIEF DESCRIPTION OF THE DRAWINGS

For a fuller understanding of the nature and objects of the present invention, reference is to be made to the following detailed description, which is to be taken in connection with the accompanying drawings, wherein:

FIG. 1 is a perspective view of a lamp incorporating a swivel according to the invention;

FIG. 2 is a perspective view of an extensible swivel constructed in accordance with the present invention;

FIG. 3 an exploded perspective of the swivel itself shown in FIG. 2;

FIG. 4 depicts, on an enlarged scale, a number of the parts of the swivel shown in FIG. 3;

FIG. 5 is a view similar to that shown in FIG. 3 but showing a variation thereof;

FIG. 6 is a perspective of the swivel in assembled condition and shown in FIG. 5;

FIG. 7 is a view similar to that shown in FIG. 4 but showing the variation of FIGS. 5 and 6;

FIG. 8 is perspective view of a variation in one operative part of the swivels shown in FIGS. 3 and 5;

FIG. 9 is a perspective view of another variation in the one operative part of the swivels shown in FIGS. 3 and 5:

FIG. 10 is a right cross section of a variation of a part shown in FIG. 2;

FIG. 11 is a view similar to FIG. 10 but depicts a further variation of parts shown in FIG. 2; and FIG. 12 is a fragmentary perspective of a variation of another part shown in FIG. 2.

DETAILED DESCRIPTION OF THE PREFERRED EMBODIMENT

Generally, the illustrated embodiment of an extensible swivel 30 constructed in accordance with the present invention is shown in FIG. 1 as being incorporated in a lamp 10. The extensible swivel 30 of the invention endows the lamp 10, or other similar device in which it may be incorporated, with a dual capability: that of giving the lamp 10 added length, i.e., axial elongation, and that of rotational adjustment, which can vary anywhere from a fraction of one revolution to several revolutions. As a practical matter however, the extensible swivel 30 incorporated in the lamp 10 will have a rotational adjustment capability varying from a fraction of one revolution to two revolutions, it being understood that the swivel's capability can easily be increased by the addition of a part or parts or of a variation of a part or parts, all as hereinafter more fully described. Further, such axial and rotational adjustment of the swivel 30 of the lamp 10, once effected, frictionally is maintained until such time that the user desires to effect a different adjustment. A retainer ring 34 prevents the user from entirely withdrawing the swivel 30 from within a bottom tube 14 of the lamp 10. The lamp 10 further includes a base 12, an upper tube 16, a horizontal part 18, a shade 20 and an electric cord 22 provided with a plug 24. It is pointed out that primarily for aesthetic purposes, the external diameters of the tubes 14 and 16 and of the retainer ring 34 preferably are identical. As a result, they present a smooth and pleasing, as well as practical, appearance.

A perspective view of the extensible swivel 30 is shown in FIG. 2. An extension sleeve 32 is secured with one end in and to the upper tube 16 with the aid of a positioning sleeve 33. The other end of the extension tube 32 is tapped, as at 26. The swivel 30 preferably is formed with an externally threaded end 28 by which it is securely mounted to the tapped end 26 of the extension tube 32. To further strengthen this mounting, the threaded end 28 can be additionally riveted to the tube 32, or a set crew, not shown, can be used for this purpose. Further, a glue also can be used in conjunction with the threaded end 28 by being introduced into the threads thereof before assembly. Where strength of mounting is of lesser importance, the threaded end 28 can be left smooth, and the swivel 30 is then secured to the end 26, also untapped, simply by the use of a strong glue. The retainer ring 34 first is slipped over the extension tube 32 however, before the swivel 30 is mounted thereto. The upper end of the retainer ring 34 defines a swiveling surface 36 when the end 38 of the upper tube 16 abuts thereagainst in its shown, non-extended position depicted in FIG. 1. The axial length of the extension sleeve 32 determines the maximum length of axial adjustment of the extensible swivel 30.

The extension sleeve 32 and the thereto attached swivel 30 are designed to be accommodated within a key sleeve 42 provided with a key 40 and secured within the bottom tube 14, whose upper end is internally threaded, as at 46. An externally threaded portion 44 of the retainer ring 34 is formed to mesh with the internally threaded end 46 of the bottom tube 14, whereby the retainer ring 34 is secured in and to the bottom tube 14.

As may be best observed in FIG. 3, the swivel 30 comprises a hollow spindle 50, preferably formed with the externally threaded end 28, on which spindle 50 are mounted the operative parts responsible for giving the swivel 30 its rotational adjustment capability. These operative parts essentially include: a stop ring 58, provided with an integral arcuate segment 70, and secured to the spindle 50 as, for example, by being soldered, glued or otherwise secured thereto; a double-leg ring member 60, provided with integral opposed arcuate segments 72 and 74, rotatably mounted about the spindle 50 and in operative association with the stop ring 58; and a stop bushing 62, also provided with an integral arcuate segment 76 and a channel 63 along its axial length, and rotatably mounted about the spindle 50 and in operative association with the double-leg ring member 60. The key 40 of the key sleeve 42 is designed to extend into and to ride within the channel 63 of the stop bushing 62. It is the respective arcuate segments 70, 72, 74 and 76 of the stop ring 58, the double-leg ring 60 and of the stop bushing 62 that cooperate, as more fully described below with reference to FIG. 4, to provide the rotational adjustment capability to the swivel 30.

In addition to the above enumerated parts, the spindle 50 also carries a plurality of spacer bushings 52 and 54, each provided with a respective channel 53 and 55 and rotatably mounted about the spindle 50 between its externally threaded end 28 and the stop ring 58, and a further spacer bushing 66 provided with a channel 67 and an end ring 68. The end ring 68, just like the stop ring 58, is secured to and about the spindle 50, as by being soldered, glued or otherwise secured thereto, and it defines the other end of the spindle 50. The spacer bushing 66 is mounted between the stop bushing 62 and the end ring 68. It is pointed out that the external diameters of the stop ring 58, the double-leg ring 60 and of the end ring 68 are identical and that they are less than the external diameters of the stop bushing 62 and of the spacer bushings 52, 54 and 66, whose external diameters preferably also are identical. Consequently, it is only the latter parts whose peripheries snugly fit against the internal periphery of the key sleeve 42. The spindle 50 preferably also is provided with one or more gaskets 56 and 64 in the form of suitable flexible "0" rings, one of which preferably is interposed between the spacer bushings 52 and 54 and the other between the spacer bushing 66 and the stop bushing 62.

It is to be noted that, as shown in FIGS. 2, 3 and 4, each of the respective arcuate segments 70, 72, 74 and 76 of the respective members 58, 60 and 62 defines an arcuate span of 90°. It is also to be noted that the opposed arcuate segments 72 and 74 of the double-leg ring member 60 extend in angularly opposed directions, as measured from a common axial line 80, please observe FIG. 4.

As a consequence of the cooperation of these arcute segments 70, 72, 74 and 76, the swivel 30 is provided with a rotational adjustment capability which is variable anywhere from a fraction of a revolution up to one full revoution, i.e., up to 360°. With particular reference to FIG. 4, this is achieved as follows. In an initial shown position, and with the stop bushing 62 held stationary by the key 40 of the key sleeve 42 projecting into the channel 63 thereof, an edge 78 of the segment 76 abuts against an edge 86 of the segment 74, and an edge 90 of the segment 72 abuts against an edge 92 of the segment 70. It will be observed that at this point, four edges are precisely aligned with the common axial line 80, namely edges 84 and 88 of the double-leg ring memeber 60 in the front and the edges 82 and 94 of the stop bushing 62 and of the stop ring 58, respectively, in the back, that is diametrically opposite to one another.

Upon rotating the upper tube 16 clockwise too, the spindle 50 and the thereto secured stop ring 58 will commence turning clockwise too, as shown by an arrow 96. As a consequence, the edge 92 will be moving away from the edge 90, and the edge 94 will move away from the common axial line 80 and toward the edge 88. The edge 94 is free to turn until it stikes against the edge 88, i.e., after completing a one half turn of 180°. At this point, the edge 94 begins to turn the segment 72 of the double-leg ring member 60, as indicated by a second arrow 98. The double-leg ring member 60 is now rotated a further one half turn until the edge 84 comes to rest against the edge 82 of the segment 76. Since the stop bushing 62 is held stationary by the key 40, further turning of the upper tube 16 with respect to the bottom tube 14 beyond the one full revolution of 360° is not possible. The upper tube 16 now can be rotated counter-clockwise one full revolution, with the operation of the segments 70, 72, 74 and 76 being reversed.

In FIGS. 5, 6 and 7, there is depicted a different embodiment of a swivel 100 also constructed in accordance with the invention. Whereas the swivel 30 shown in and described with reference to FIGS. 2–4 gives a maximum rotation of one full revolution, i.e., 360°, the swivel 100 provides a maximum rotation of one and one-half revolutions, i.e., 540° of rotation in one direction. The essential difference between the swivels 30 and 100 resides in that, in the swivel 100 an additional double-key member 102 has been added and mounted about a spindle 51, which is somewhat longer than the spindle 50 so as to accommodate the extra ring member 102. It will be observed that the ring 102 is disposed about the spindle 51 between the first double-leg ring member 60 and the stationarily mounted stop ring 58. The ring member 102 is in all respects identical with the ring member 60. First, the ring member 102 also is formed with a pair of opposed arcuate segments 104 and 106, which segments 104, 106 also extend in angularly opposed directions from a common axial line. Further, the segments 104 and 106 also define respective radial spans of 90° each. The arcuate segment 104 has edges 108 and 110, and the arcuate segment 106 has edges 112 and 114.

From a shown initial position, FIG. 7, and with the stop bushing 62 held stationary by the key 40, the upper tube 16, the spindle 51 and the thereto secured stop ring 58 are all again turned clockwise, in unison, as indicated by the arrow 96. The edge 92 of the segment 70, which has abutted the edge 110 of the segment 104 of the second double-leg ring member 102, will commence moving away therefrom, and the edge 94 will move away from the common axial line 80. The spindle 51 and thereto attached stop ring 58 are free to turn until the edge 94 strikes against the edge 108 of the second ring member 102, i.e., after competing a one half turn of 180°. At this point, the edge 94 begins to turn the segment 104 of the second ring member 102, as indicated by an arrow 116. The second ring member 102 now is rotated a further one half turn until the edge 112 of the segment 106 comes up against the edge 88 of the segment 72 of the first ring member 60, whereupon the ring member 60 begins to turn, as indicated by the arrow 98. After another one half turn of 180°, the edge 84 strikes the edge 82 of the segment 76 formed on the stop bushing 62. Since the bushing 62 is held stationary, further turning of the upper tube 16 with respect to the bottom tube 14, beyound the above described one and one half revolutions (i.e., 540°) is not possible. The upper tube 16 now can be rotated counter-clockwise the same one and one half revolutions, with the operation of the respective arcuate segments 70, 104, 106, 72, 74 and 76 being reversed. Each of these arcuate segments defines an angular span of 90°.

If it is desired to increase the rotational capability of the swivel 100 beyond the one and one half revolutions, this is achieved by adding one or more further double-key ring members, identical to members 60 and 102, above described. For each additional double-leg ring member mounted about the spindle 51, a further one half revolution (180°) is gained.

There is another way of increasing or decreasing the rotational capability of either of the swivels 30 or 100 and that is by other than a one half revolution. This is illustrated in FIGS. 8 and 9. A different kind of a double-leg ring member 118 is shown in FIG. 8. Ring member 118, unlike the ring members 60 and 102, has opposed arcuate segments 120 and 122 whose angular span is less than 90°. Consequently, the use of the ring member 118 fractionally increases the rotational capability of a swivel in which it is used. This fractional increase depends on two factors: first, on the actual reduction in the angular span of the segments 120 and 122 from the 90° and, second, on the number of arcuate segments in the particular swivel in whose angular span the reduction occurs. For example, if the segments 120 and 122 have been reduced by 10°, i.e., from 90° to 80°, and the arcuate segments 70 and 76 of the stop ring 58 and the stop bushing 62, respectively, also have been reduced likewise by 10°, i,e, from 90° to 80°, in a swivel, not shown, but otherwise just like the one shown in and described with reference to FIG. 4, the rotational capability of the resultant swivel would be increased by 40° beyond the one full revolution, i.e., from 360° to 400°. And in a swivel employing two such double-leg ring members, as in FIG. 7, where all six respective arcuate segments have been reduced by 10°, an additional 60° rotational capacity is added to the one and one half revolutions, namely, 60° plus 540°, for a total of 600°.

In like but opposed fashion, the rotational capability of a swivel can be reduced fractionally by using another and different double-leg ring member 124 shown in FIG. 9. Ring member 124 also is provided with a pair of opposed arcuate segments 126 and 128, but whose angular spans are greater than 90°. Again, for each 10° increase, multiplied by the number, of arcuate segments in the particular swivel cooperative with one another, and likewise increased by 10°, the rotational capacity of the swivel will be decreased accordingly.

In FIG. 10, there is shown, in right cross section, an alternate key sleeve 43 for use in lieu of the key sleeve 42 of FIG. 2. Alternate key sleeve 43 also is provided with a key 41, which is formed by forming an axial depression in a tube until its diameter is reduced to the size of the sleeve 43, with the axial depression forming the key 41. Preferably, the key 41 is reinforced by a plurality of steel support wires 45, as shown.

In FIG. 11, there is illustrated, in right cross section, an alternate bottom tube 14A, which incorporates an integrally formed key 40A and thus features no separate key sleeve. The tube 14A can be manufactured in any known manner, as for example by extrusion. The upper end of the tube 14A also will be formed with an internally threaded portion so as to accommodate therein the externally threaded part 44 of the retainer ring 34, all as previously explained. And in FIG. 12, there is shown, in fragmentary perspective, an alternate retainer ring 34A. Retainer ring 34A differs from the retainer ring 34 in only one respect, and that is the incorporation therein of an internal protective sleeve 35. Protective sleeve 35, preferably made from a suitable plastic material, such as Teflon, or felt or other like material, is designed to prevent disfiguration, as by scratching, of the extension sleeve 32 when the latter is withdrawn from the bottom tube 14 and through the ring 34A.

As mentioned above, the outer diameters of the extension sleeve 32, the stop ring 58, the double-leg ring members 60 and 102, and of the end ring 68 preferably are identical and designed so as to ride freely both within the retainer ring 34 and the key sleeve 42.

The outer diameters of the spacer bushings 52 and 54 and of the stop bushing 62, on the other hand, while also identical, are designed snugly to fit and to be axially displaced within the key sleeve 42. Thus, while preferably and primarily, the swivels 30 and 100 are designed frictionally to be arrested and held in place by the flexible gaskets 56 and 64 (preferably formed of rubber or the like as "0" rings), the swivels 30 and 100 will also hold their selected positions even without the gaskets 56 and 64, albeit not as steadfastly. The swivels 30 and 100 will be that much easier to adjust without the presence of the gaskets 56 and 64, however. The gaskets 56 and 64 are pespectively held in place by the spacer bushings 52 and 54 and by the spacer bushing 66 and the stop bushing 62. The top spacer bushing 52 also serves to prevent the accidental withdrawal of the swivel 30 or 100 from within the bottom tube 14 by being stopped by the retainer ring 34.

Thus it has been shown and described an extensible swivel 30 and 100 for a lamp 10 or the like, which swivel 30 or 100 satisfies the objects and advantages set forth above.

Since certain changes may be made in the present disclosure without departing from the scope of the present invention, it is intended that all matter described in the foregoing specification or shown in the accompanying drawings, be interpreted in an illustrative and not in a limiting sense.

What is claimed is:
1. A swivel comprising:
   (a) a spindle;
   (b) a stop ring having an arcuate segment and secured about said spindle;
   (c) a double-leg ring member having integral arcuate segments and mounted about said spindle in operative association with said stop ring;
   (d) a stop bushing having an arcuate segment and a channel and mounted about said spindle in operative association with said double-leg ring member; and
   (e) an end ring secured about said spindle to contain said stop bushing and said double-leg ring member about said spindle between it and said stop ring.
2. The swivel of claim 1 wherein said spindle is hollow and each of said arcuate segments defines a span of 90°.
3. The swivel of claim 1 wherein said opposed arcuate segments of said double-leg ring member extend in angularly opposed directions from a common axial line.
4. The swivel of claim 1 wherein the external diameters of said stop ring and of said double-leg ring member are identical to each other and are less than the external diameter of said stop bushing.
5. The swivel of claim 1 wherein each of said arcuate segments defines a span of less than 90°.
6. The swivel of claim 1 wherein each of said arcuate segments defines a span of more than 90°.

7. The swivel of claim 1 wherein some of said arcuate segments define a span of less than 90° and others of said arcuate segments define a span of more than 90°.
8. The swivel of claim 1 including a plurality of said double-leg ring member.
9. The swivel of claim 1 further including a plurality of spacer bushings and at least one flexible gasket, all mounted about said spindle.
10. A swivel comprising:
   (a) upper and lower tubular members and a retainer ring disposed between the ends thereof, said members and said ring having indentical outside diameters;
   (b) an extension sleeve secured with one end in said upper tubular member and having a tapped end;
   (c) a key sleeve having a key and secured in said lower tubular member; and
   (d) a swivel mounted to said tapped end of said extension sleeve and designed to be accommodated, for axial and rotational adjustment, within said key sleeve;
   (e) said swivel comprising a spindle having an externally-threaded end, a stop ring having an arcuate segment and secured about said spindle, a double-leg ring member having integral arcuate segments and mounted about said spindle in operative association with said stop ring and, a stop bushing having an arcuate segment and a channel and mounted about said spindle in operative association with said double-leg ring member;
   (f) said key of said key sleeve designed to extend into said channel of said stop bushing.
11. The swivel of claim 10 wherein said spindle is hollow and wherein each of said arcuate segments defines a span of 90°.
12. The swivel of claim 10 wherein some of said arcuate segments define a span of less than 90° and others of said arcuate segments define a span of more than 90°.
13. The swivel of claim 10 including a plurality of said double-leg ring member.
14. The swivel of claim 10 further including a plurality of spacer bushings and at least one flexible gasket, all mounted about said spindle.
15. The swivel of claim 10 wherein said opposed arcuate segments of said double-leg ring member extend in angularly opposed directions from a common axial line.
16. The swivel of claim 10 wherein the external diameter of said stop bushing is designed frictionally to engage the internal periphery of said key sleeve.
17. The swivel of claim 10 wherein the length of said extension sleeve determines the extent of said axial adjustment of said swivel, and said rotational adjustment thereof is variable from a fraction of a revolution to several revolutions.
18. The swivel of claim 10 wherein said key of said key sleeve is formed integral with and of said key sleeve as a radially-inwardly protruding projection thereof.
19. The swivel of claim 17 further including a retainer ring designed to retain said swivel within said key sleeve, and wherein said key sleeve is formed integral with said lower tubular member.
20. The swivel of claim 19 which is hollow and designed spirally to accommodate therein an electric cord, and wherein said retainer ring is formed with a protective sleeve.

* * * * *